United States Patent
Abdelli

(10) Patent No.: US 11,939,047 B2
(45) Date of Patent: Mar. 26, 2024

(54) METHOD AND DEVICE FOR ASSISTING THE PILOTING OF A ROTORCRAFT PROVIDED WITH AT LEAST ONE PROPELLER

(71) Applicant: AIRBUS HELICOPTERS, Marignane (FR)

(72) Inventor: Kamel Abdelli, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 38 days.

(21) Appl. No.: 17/746,591

(22) Filed: May 17, 2022

(65) Prior Publication Data

US 2022/0402601 A1 Dec. 22, 2022

(30) Foreign Application Priority Data

Jun. 17, 2021 (FR) .................................. 2106451

(51) Int. Cl.
- *B64C 27/57* (2006.01)
- *B64C 27/26* (2006.01)
- *B64D 31/12* (2006.01)
- *B64D 35/04* (2006.01)

(52) U.S. Cl.
CPC .............. *B64C 27/57* (2013.01); *B64C 27/26* (2013.01); *B64D 31/12* (2013.01); *B64D 35/04* (2013.01)

(58) Field of Classification Search
CPC ......... B64C 27/57; B64C 27/26; B64C 27/22; B64D 31/12; B64D 35/04; B64D 43/00; G01C 23/00
See application file for complete search history.

(56) References Cited

U.S. PATENT DOCUMENTS

| | | | |
|---|---|---|---|
| 4,034,605 A | 7/1977 | Green | |
| 4,514,142 A | 4/1985 | Young | |
| 6,195,598 B1* | 2/2001 | Bosqui | G01D 7/04 340/963 |

(Continued)

FOREIGN PATENT DOCUMENTS

| | | | |
|---|---|---|---|
| FR | 2756256 A1 | 5/1998 | |
| FR | 2854128 A1 | 10/2004 | |

(Continued)

OTHER PUBLICATIONS

French Search Report for French Application No. FR2106451, Completed by the French Patent Office, dated Feb. 16, 2022, 9 pages.

*Primary Examiner* — Assres H Woldemaryam
(74) *Attorney, Agent, or Firm* — BROOKS KUSHMAN P.C.

(57) ABSTRACT

A method and a device for assisting the piloting of a propeller rotorcraft having a rotary wing and at least one propeller. The piloting assistance device comprises a computer configured to display the following on a display: (i) a first scale representing a power consumed by the at least one propeller and carrying a minimum power mark and a maximum power mark, (ii) a second scale graduated in forward speed of the propeller rotorcraft, (iii) an index comprising a power section representing a current power consumed by the at least one propeller, the index comprising a speed section indicating a current forward speed on the second scale.

24 Claims, 4 Drawing Sheets

(56) References Cited

U.S. PATENT DOCUMENTS

| | | | | |
|---|---|---|---|---|
| 6,298,289 B1* | 10/2001 | Lloyd | ............... | B64G 1/283 |
| | | | | 701/13 |
| 7,143,003 B2* | 11/2006 | Certain | ............... | G01D 1/18 |
| | | | | 702/144 |
| 7,149,646 B2* | 12/2006 | Certain | ............ | B64D 43/00 |
| | | | | 702/144 |
| 8,568,096 B2* | 10/2013 | Eglin | ............ | G05D 1/0858 |
| | | | | 416/49 |
| 9,216,820 B2* | 12/2015 | Eglin | ............... | B64C 27/28 |
| 9,272,778 B2* | 3/2016 | Eglin | ............... | B64C 27/04 |
| 9,409,655 B1* | 8/2016 | Vallart | ............ | B64C 27/57 |
| 10,176,723 B2* | 1/2019 | Gadgil | ............ | B64D 47/08 |
| 2004/0215375 A1 | 10/2004 | Andre et al. | | |
| 2009/0321554 A1 | 12/2009 | Roesch | | |
| 2010/0310371 A1 | 12/2010 | Eglin | | |
| 2010/0312421 A1* | 12/2010 | Eglin | ............... | B64C 27/04 |
| | | | | 701/14 |
| 2019/0189373 A1* | 6/2019 | Abdelli | ............ | H01H 23/30 |
| 2020/0094952 A1* | 3/2020 | Cerqueira | ............ | G01C 23/00 |
| 2020/0398980 A1* | 12/2020 | Abdelli | ............ | B64C 27/56 |
| 2020/0401142 A1* | 12/2020 | Abdelli | ............ | B64C 27/22 |

FOREIGN PATENT DOCUMENTS

| | | | |
|---|---|---|---|
| FR | 2916418 | A1 | 11/2008 |
| FR | 2946315 | A1 | 12/2010 |
| FR | 2946322 | A1 | 12/2010 |
| FR | 3097527 | A1 | 12/2020 |

* cited by examiner

METHOD AND DEVICE FOR ASSISTING THE PILOTING OF A ROTORCRAFT PROVIDED WITH AT LEAST ONE PROPELLER

CROSS REFERENCE TO RELATED APPLICATIONS

This application claims priority to French patent application No. FR 21 06451 filed on Jun. 17, 2021, the disclosure of which is incorporated in its entirety by reference herein.

TECHNICAL FIELD

The present disclosure relates to a method and a device for assisting the piloting of a rotorcraft provided with at least one propeller and a rotorcraft provided with such a device.

BACKGROUND

More particularly, the disclosure therefore relates to a rotorcraft having a rotary wing and at least one propeller. Such a rotorcraft is thus referred to hereinafter, for convenience, as a "propeller rotorcraft".

Such a propeller rotorcraft is described in document FR 2 916 418.

A rotorcraft denotes an aircraft provided with a rotary wing comprising at least one main rotor. A rotorcraft traditionally comprises an airframe and at least one main rotor rotated by a power plant. Such a main rotor may be described as a "lift rotor" because it contributes to the lift of the aircraft, this main rotor also being able to contribute to the forward travel of the aircraft.

A propeller rotorcraft additionally comprises one or more propeller-type rotors contributing at least partially to the forward travel of the rotorcraft. For the sake of simplification, the term "propeller" is used hereinafter to denote a pusher or tractor forward propeller.

In particular, a propeller rotorcraft comprises an airframe, at least one main rotor, one or more propellers optionally positioned laterally with respect to the fuselage, and indeed at least one additional lift surface.

This additional lift surface may comprise at least two wings arranged to either side of the fuselage. The propeller rotorcraft may therefore comprise at least one propeller, or indeed two propellers positioned to either side of the fuselage, for example on the wings.

According to another aspect, a power plant of the propeller rotorcraft may comprise at least one engine. This engine or engines may be connected by a mechanical interconnection system to the propeller or propellers and to said at least one main rotor. The rotational speeds of the output of the engine or engines, the propeller or propellers, the main rotor and the interconnection system are, for example, proportional to each other, the proportionality ratio being constant regardless of the flight configuration of the propeller rotorcraft under normal operating conditions. Therefore, the main rotor is advantageously rotated constantly by the engine or engines in normal flight configurations.

In order to control a propeller rotorcraft, a collective pitch component and a cyclic pitch component of the pitch of the blades of the main rotor may be controlled.

Moreover, a propeller rotorcraft may comprise at least one mechanical channel for collectively controlling the pitch of the blades of the propeller or propellers in order to control each propeller. The propeller or propellers may thus act on the forward speed of the propeller rotorcraft.

In particular on a rotorcraft with at least two propellers situated to either side of an airframe, the pitch of the blades of each propeller may be a function of a mean pitch component and a differential pitch component. Thus, the first pitch of the first blades of a first propeller may be equal to the sum of the mean pitch component plus the differential pitch component, while the second pitch of the second blades of a second propeller may be equal to the mean pitch component minus the differential pitch component. Furthermore, the mean pitch component may be equal to the half-sum of the first and second pitches while the differential pitch component may be equal to the half-difference between the first and second pitches. Therefore, directional control functions, in particular for yaw control, can be performed by using a yaw control suitable for modifying the value of the differential pitch component. For example, such a yaw control may comprise a rudder bar connected to the propellers via a control system having mechanical and/or electrical architecture. The rudder bar allows the value of the differential pitch component to be modified. Moreover, the propeller rotorcraft includes at least one thrust control suitable for modifying the value of the mean pitch component, via the control system.

Irrespective of the number of propeller(s), a pilot needs to take various limits into consideration.

In particular, the power produced by the power plant is distributed particularly between the propeller or propellers and the main rotor. The pilot must control the propeller or propellers while ensuring that the main rotor always receives sufficient driving power.

Moreover, the pilot must control the main rotor and the propeller or propellers in such a way as to stay within the structural limits of the interconnection system.

Moreover, the blades of the propeller or propellers must not enter aerodynamic stall.

On a helicopter, the pilot controls the cyclic pitch component of the blades of the main rotor in order to obtain a nose-down attitude so as to control the forward speed of the aircraft. Moreover, the collective pitch component of the blades of the main rotor is increased in order to keep the aircraft at the same altitude. Management of the forward speed therefore also requires management of the power delivered to the rotor in order to maintain a constant altitude.

On a propeller rotorcraft, forward flight can be carried out according to a "helicopter" operating mode, but also in an "airplane" operating mode. In this "airplane" operating mode, from a certain forward speed, part of the vertical lift is provided by the rotary wing and another part of the lift by the wings. The collective pitch component of the blades of the rotary wing is then reduced because the rotary wing is assisted by the wings, the rotary wing drawing less power from the power plant. Moreover, the pitch of the blades of the propeller or propellers is, in contrast, increased in order to achieve the desired forward speed, the propeller or propellers then drawing more power from the power plant. A pilot must therefore carefully manage the increase in the pitch of the propellers in order for the rotary wing to receive sufficient power. Therefore, management of the forward speed goes hand in hand with management of the power delivered by the power plant.

In order to assist a pilot, one teaching therefore consists in providing an indicator equipped with an air speed scale giving the forward speed of the aircraft and a power scale. The air speed scale and the power scale are separate because they do not relate to the same parameters.

Such an indicator requires various measurement scales to be monitored and the displayed data to be correctly interpreted.

Patent FR 2 946 322 A1 describes a device for assisting the piloting of a hybrid helicopter provided with a rotary wing, two half-wings provided respectively with first and second propellers, and a power plant that permanently rotates said rotary wing and said propellers by engaging a mechanical interconnection system. Moreover, this device is provided with a calculation means for determining a maximum mean pitch applicable to said first and second propellers without exceeding the power available to said propellers, said calculation means determining said maximum mean pitch ($\beta$max) as a function of the current mean pitch of the blades of the first and second propellers measured in real time, a maximum power that can be delivered by said power plant, a current power delivered by this power plant and a first relationship determining a power gradient as a function of the pitch of said first and second propellers.

Document U.S. Pat. No. 4,514,142 discloses an aircraft provided with a power plant, a main rotor and a rear propeller arranged at the rear of a tail boom. According to this document, a generator generates a first signal, in the form of a voltage, which is transmitted to a means providing a second signal carrying a power available for the propeller. A display can display the change over time of this power available for the rear propeller.

Patent FR 2 756 256 discloses an indicator displaying the power margin available for a turboshaft engine of a helicopter on an indicator graduated in degrees of collective pitch of the main rotor blades.

Document FR 3 097 527 discloses an indicator for a hybrid rotorcraft provided with at least one propeller and one rotary wing.

Document U.S. Pat. No. 4,034,605 describes an indicator moving a marker against a background containing power/air speed curves.

However, this teaching does not make it possible to produce a device for assisting the piloting of a propeller rotorcraft having not only a main rotor but also at least one propeller connected to the main rotor by an interconnection system. Indeed, the specific nature of a propeller rotorcraft means that an order given to the main rotor has consequences on the propeller or propellers, and vice versa; therefore, this prior art cannot be applied to such a rotorcraft.

Similarly, document FR 2 854 128 A1 describes a flight control indicator for an aircraft, in particular a transport airplane. The flight control indicator displays, on a display, a dial that is graduated in percent, the maximum of which represents the maximum thrust available for the current flight phase, in the current configuration of the aircraft and for the current anemometric conditions. The dial is provided with characteristic signs respectively representing the commanded and actual thrusts, which are expressed as percentages of the maximum thrust.

SUMMARY

An object of the present disclosure is therefore to propose an alternative piloting assistance method that helps facilitate the piloting of a propeller rotorcraft in order to optimize the performances of the propeller rotorcraft while ensuring its safety.

The disclosure therefore relates to a method for assisting the piloting of a propeller rotorcraft, said propeller rotorcraft having a power plant connected by a mechanical system to a rotary wing and to at least one propeller.

The method includes the following steps:

displaying, at the command of a computer and on a display, a minimum power mark and a maximum power mark on a first scale, said first scale representing a power consumed by said at least one propeller, the minimum power mark representing a minimum power that can be consumed by said at least one propeller, the maximum power mark representing a maximum power that can be consumed by said at least one propeller, said computer determining where to situate the minimum power mark and the maximum power mark on the first scale;

displaying, at the command of the computer and on the display, a second scale graduated in forward speed of the propeller rotorcraft; and displaying, at the command of the computer and on the display, an index comprising a power section representing a current power consumed by said at least one propeller, said index comprising a speed section indicating a current forward speed on said second scale, said index and said first scale being able to move relative to each other, said index and said second scale being able to move relative to each other, said computer determining where to situate the index.

The term "graduated" used previously and hereinafter means that the associated scale is expressed in the unit in question. Therefore, the second scale is expressed in forward speed, for example in air speed. The scales in question may or may not display graduations.

The expression "current power consumed by said at least one propeller" refers to the power consumed jointly by the propeller or propellers and therefore likely to have an impact on the power delivered to the rotary wing. The expression "the propeller or propellers" refers to the only propeller, when a single propeller is present, or to all the propellers, when several propellers are present. The position of the power section relative to the first scale is an indication of the current power, in that it either carries that current power or represents the position of an interface controlling that current power.

Therefore, a single index points to both the first scale indicating the power consumed by the propeller or propellers and the second scale indicating the forward speed of the propeller rotorcraft.

Thus, the display represents an indicator displaying, in a simple and legible manner, on the first scale, a parameter representing the power consumed by the propeller or propellers and, on the second scale, the current forward speed of the rotorcraft.

The information thus displayed on the display enables a pilot to easily and quickly evaluate the power consumed by the propeller or propellers in order not to exceed a power limit when the pilot is modifying the mean pitch of the blades of the propeller or propellers in order to modify the forward speed of the rotorcraft.

Irrespective of the number of propellers, the expression "mean pitch" denotes the component of the pitch of the blades of the propeller or propellers acting on the forward travel of the rotorcraft, and "differential pitch" denotes the component of the pitch of the blades of the propeller or propellers acting, if applicable, on yawing motion. On a rotorcraft with two propellers arranged to either side of the airframe, the mean pitch may be equal to the half-sum of the pitches of the blades of the propellers, and the differential pitch may be equal to the half-difference between the pitches of the blades of the propellers. On a rotorcraft having one or more propellers that do not help control yawing motion, the differential pitch may be zero.

Therefore, the piloting assistance device enables a pilot to safely increase or decrease the pitch of the blades of the propeller or propellers.

The piloting assistance device may also comprise one or more of the following features.

According to one possibility, the first scale may be stationary, the method may comprise, at the command of said computer, displaying said index on the display relative to the first scale, displaying the minimum power mark and the maximum power mark on the display relative to the index and adjusting the second scale in order for said index to indicate the current forward speed.

The index cannot be deformed, i.e., it is always the same shape. The same applies to the first scale. The computer therefore evaluates the position that the index needs to reach on the first scale, then adjusts the positions of the minimum power mark and the maximum power mark relative to the index. Moreover, the computer adjusts the second scale in order to make the current forward speed correspond to the index.

The computer may move the second scale relative to the index and/or may locally compress and/or expand the second scale in order for the index to pinpoint the current forward speed of the rotorcraft on the second scale.

According to a first variant, the first scale may be graduated in positions of an interface controlling a mean pitch of each blade of the propeller or propellers.

The interface controls the mean pitch of the blades of the propeller or propellers, this mean pitch having an impact on the power consumed by the propeller or propellers. Therefore, the current position of the interface is an indication of the current power consumed by the propeller or propellers.

The method may thus comprise using a position sensor to measure a current position of the interface controlling a mean pitch of each blade of said at least one propeller, said interface being able to move between a first position and a second position shown by ends of the first scale, said first scale being graduated in positions of said interface, said method comprising the following steps:
  using the computer to determine the maximum power, the minimum power and the current power, the computer possibly receiving signals from sensors suitable for this purpose;
  displaying, on the display controlled by the computer, said index as a function of said current position;
  displaying, on the display controlled by the computer, said maximum power mark relative to the index as a function of a first difference between the current power and the maximum power; and
  displaying, on the display controlled by the computer, said minimum power mark relative to the index as a function of a second difference between the current power and the minimum power.

Optionally, the method comprises using said computer to convert said first difference and the second difference into first and second respective pitch margins by means of a pitch law providing a pitch margin based on a power margin and a power gradient as a function of the pitch, said method comprising using said computer to convert, by means of a conversion law, said first pitch margin and said second pitch margin into a first distance separating the index from the maximum power mark and a second distance separating the index from the minimum power mark.

The teaching of patent FR 2 946 322 is applicable, since this patent discloses such a pitch law.

The conversion law and the pitch law may be established by trials, calculations and/or simulations.

The term "law" refers to any means that make it possible to perform the calculations in question, such as stored tables of values, equations or charts, etc.

According to a second variant, the first scale may be a power scale as such.

The method may then comprise the following steps:
  using the computer to determine the maximum power, the minimum power and the current power; and
  using the computer to position said index and the minimum power mark and maximum power mark relative to the first scale as a function of the current power and the minimum power and the maximum power, said first scale being graduated in power.

Irrespective of the variant, using the computer to determine the maximum power may comprise the following steps:
  using the computer to determine an available power that can be delivered by the power plant, an engine power sensor transmitting an engine power signal carrying the available power to the computer;
  using the computer to determine a rotor power consumed by the rotary wing, a rotor power sensor transmitting a rotor power signal carrying the rotor power to the computer; and
  using the computer to determine a difference between the available power and the rotor power.

Optionally, the maximum power is equal to the difference between the available power and the rotor power. Optionally, the available power is established as a function of installation losses and the power consumed by members (alternator, pump, etc.) other than the rotary wing and the propeller or propellers, for example measured in a conventional manner by dedicated sensors, or these installation and power losses are disregarded.

Alternatively, and in particular if the power plant is oversized, using the computer to determine the maximum power may comprise using the computer to determine a limit power of the mechanical system, the maximum power being equal to the lesser of the limit power and the difference between the available power and the rotor power.

This limit power may be fixed and stored in the computer. Alternatively, said piloting assistance device may comprise a propeller speed sensor transmitting a speed signal to the computer carrying a speed of rotation of said at least one propeller, said limit power being equal to the product of a predetermined torque and said speed of rotation.

Similarly, the minimum power may be either a constant or equal to the product of the predetermined torque and a speed of rotation. This speed of rotation may then be measured by a propeller speed sensor transmitting a speed signal to the computer carrying the speed of rotation directly or to within a proportionality coefficient. For example, the speed of rotation is equal to the product of a predetermined coefficient and a current speed of rotation of the rotary wing or another member of the installation that is able to rotate together with a propeller.

According to one possibility compatible with the preceding possibilities, the power section may comprise a shape that matches a shape of the minimum power mark and a shape of the maximum power mark.

The expression "shape that matches" means that one shape fits perfectly into the other shape.

Therefore, a pilot can easily detect if a power threshold is reached.

Advantageously, the power section may comprise a hollow diamond shape, said maximum power mark having two upper faces matching two faces of said diamond and said minimum power mark having two lower faces matching two other faces of said diamond.

According to one possibility compatible with the preceding possibilities, said speed section may surround a value of the current forward speed.

A pilot may therefore easily view the current forward speed.

According to one possibility compatible with the preceding possibilities, the first scale and said second scale are parallel to each other.

This arrangement allows the displayed data to be viewed clearly.

According to one possibility compatible with the preceding possibilities, the method may comprise displaying, on the display, at the command of the computer, relative to the first scale, a maximum lift mark carrying a maximum lift coefficient of said at least one propeller and a minimum lift mark carrying a minimum lift coefficient of said at least one propeller, said index possibly comprising a lift section having a shape that matches the shapes of the minimum lift mark and the maximum lift mark.

The maximum lift coefficient and the minimum lift coefficient of a blade of a propeller are associated respectively with two specific angles of attack of this blade. The computer positions the maximum lift mark and the minimum lift mark relative to the first scale at positions causing the blades of the propeller to be positioned respectively at these two specific angles of attack.

When several propellers are present, the minimum lift and maximum lift marks may be controlled by the angle of attack of the blades of one of the propellers, for example. Optionally, the maximum lift mark is controlled by the propeller having the smallest margin with respect to its maximum lift coefficient and the minimum lift mark is controlled by the propeller having the smallest margin with respect to its minimum lift coefficient.

Thus, when the index is arranged between the maximum and minimum lift marks, the propellers function normally.

According to one possibility compatible with the preceding possibilities, the second scale may separate a first side and a second side, the maximum lift mark and the minimum lift mark being situated on the first side, the maximum power mark and the minimum power mark being situated on the first scale, on the second side.

The information displayed is therefore perfectly legible.

According to one possibility compatible with the preceding possibilities, said method comprises using the computer to determine positions of the maximum lift mark and the minimum lift mark in relation to the first scale as a function of a placement law providing the position of the maximum lift mark within the first scale as a function of the maximum lift coefficient and the position of the minimum lift mark within the first scale as a function of the minimum lift coefficient.

To this end, the placement law may be established by trials, simulations and/or calculations, for example.

The angle of attack of the blades of a propeller, and therefore the positions of the minimum and maximum lift marks, depends in particular on the pitch of the blades, the speed of rotation of the propeller and the air speed vector of the aircraft.

The placement law may be a function of the forward speed of the rotorcraft measured with the forward speed sensor and/or a vertical speed of the rotorcraft, and/or a speed of rotation of a propeller measured with the propeller speed sensor, and/or an angle of attack of the rotorcraft measured with an angle of attack sensor. According to one example, the placement law provides a distance between the lift mark in question and the index as a function of a difference between the current angle of attack and the stored angle of attack associated with the lift coefficient in question, and a predetermined formula transforming this difference into a power margin according to the second variant or into a position margin of the control interface according to the first variant.

According to another example, the placement law provides a distance between the lift mark in question and the index as a function of a difference between the current lift coefficient associated with the current angle of attack and the limit lift coefficient in question, and a predetermined formula transforming this difference into a power margin according to the second variant or a position margin of the control interface according to the first variant.

According to one possibility compatible with the preceding possibilities, said method comprises the following steps:

using said computer to calculate a maximum forward speed for a position of the index on the maximum lift mark or the maximum power mark closest to the index, and displaying this maximum forward speed on the display;

using said computer to calculate a minimum forward speed for a position of the index on the minimum lift mark or the minimum power mark closest to the index, and displaying this minimum forward speed on the display; and using said computer to adjust the second scale as a function of the current forward speed, the minimum forward speed and the maximum forward speed.

The computer therefore calculates, for the closest lower limit and the closest upper limit, the forward speeds at which these limits can be reached.

To this end, the computer stores two speed laws providing the maximum speed respectively as a function, for example, of the maximum lift coefficient and the maximum power, and two speed laws providing the minimum speed respectively as a function of the minimum lift coefficient and the minimum power. These speed laws may be established by trials, simulations and/or calculations.

According to one possibility compatible with the preceding possibilities, said method may comprise displaying, on the display and at the command of said computer, a zero-thrust mark carrying a zero forward thrust applied by said at least one propeller.

The computer may store the power at which the propeller or propellers together apply a thrust that has no impact on the forward travel of the rotorcraft. The computer then situates the zero-thrust mark at the corresponding location within the first scale. The zero-thrust mark may also extend over the first scale or indeed, if applicable, at the lift section.

The computer may comprise a formula providing a mean pitch of the blades of the propeller or propellers inducing the zero forward thrust. Patent FR 2 946 315 discloses such a formula for a rotorcraft with two propellers.

According to the first variant, the computer may use the conversion law to convert this mean zero-thrust pitch into a position of the interface. According to the second variant, the computer may convert this mean zero-thrust pitch into power.

Optionally, said zero-thrust mark may comprise a shape that matches a shape of the power section.

Optionally, said zero-thrust mark may be in the shape of a diamond that can fit into a hollow diamond of the power section.

The disclosure also relates to a device for assisting the piloting of a propeller rotorcraft, said propeller rotorcraft having a power plant connected by a mechanical system to a rotary wing and to at least one propeller. The piloting assistance device comprises a computer and a display configured to apply the method described above.

In particular, the computer may be configured to:
control the display to display a minimum power mark and a maximum power mark on a first scale, said first scale representing a power consumed by said at least one propeller, the minimum power mark representing a minimum power that can be consumed by said at least one propeller, the maximum power mark representing a maximum power that can be consumed by said at least one propeller;
control the display to display a second scale graduated in forward speed of the propeller rotorcraft; and
control the display to display an index comprising a power section representing a current power consumed by said at least one propeller, said index comprising a speed section indicating a current forward speed on said second scale, said index and said first scale being able to move relative to each other, said index and said second scale being able to move relative to each other.

The piloting assistance device may comprise at least one of the following members: a position sensor emitting a signal carrying a current position of an interface controlling a mean pitch of the blades of said at least one propeller, a forward speed sensor emitting a signal to the computer carrying a current forward speed of the rotorcraft, a propeller power sensor emitting a signal to the computer carrying a power consumed by said at least one propeller, a rotor power sensor emitting a signal to the computer carrying a power consumed by said rotary wing, an angle of attack sensor emitting a signal to the computer carrying an angle of attack of the rotorcraft, an engine power sensor emitting a signal to the computer carrying a power consumed by the power plant and an engine computer emitting a signal to the computer carrying an available power.

The computer may be configured to determine a position of the index relative to the first scale and the positions of the minimum power mark and the maximum power mark relative to the index and an adjustment of the second scale in order for said index to indicate the current forward speed.

According to the first variant, the computer may be configured to determine the maximum power, the minimum power and the current power, to determine the position of the index relative to the first scale as a function of said current position, to determine the position of said maximum power mark relative to the index as a function of a first difference between the current power and the maximum power, and to determine the position of said minimum power mark relative to the index as a function of a second difference between the current power and the minimum power.

The computer may be configured to convert the first difference and the second difference into first and second respective mean pitch margins of the blades of the propeller or propellers by means of a pitch law providing a pitch margin based on a power margin and a power gradient as a function of the pitch, and to convert, by means of a conversion law, said first pitch margin and said second pitch margin into a first distance separating the index from the maximum power mark and a second distance separating the index from the minimum power mark.

According to the second variant, the computer may be configured to determine the maximum power, the minimum power and the current power, and to position the index and the minimum power mark and maximum power mark relative to the first scale as a function of the current power and the minimum power and the maximum power, said first scale being graduated in power.

Irrespective of the variant, the computer may be configured to determine an available power, a rotor power consumed by the rotary wing and a difference between the available power and the rotor power.

The maximum power may be equal to the difference between the available power and the rotor power or to the lesser of a limit power and the difference between the available power and the rotor power.

The computer may be configured to display, relative to the first scale, a maximum lift mark carrying the maximum lift coefficient of said at least one propeller and a minimum lift mark carrying the minimum lift coefficient of said at least one propeller, said index comprising a lift section having a shape that matches a shape of the minimum lift mark and a shape of the maximum lift mark.

The computer may be configured to determine positions of the maximum lift mark and the minimum lift mark in relation to the first scale as a function of a placement law providing the position of the maximum lift mark within the first scale as a function of the maximum lift coefficient and the position of the minimum lift mark within the first scale as a function of the minimum lift coefficient.

The computer may be configured to determine a maximum forward speed for a position of the index on the maximum lift mark or the maximum power mark closest to the index, to display this maximum forward speed on the display, to determine a minimum forward speed for a position of the index on the minimum lift mark or the minimum power mark closest to the index, to display this minimum forward speed on the display, and to adjust the second scale as a function of the current forward speed, the minimum forward speed and the maximum forward speed.

The computer may be configured to determine a position, on the display, of a zero-thrust mark carrying a zero forward thrust applied by said at least one propeller, and to display this mark.

The disclosure also relates to a propeller rotorcraft provided with such a piloting assistance device, said propeller rotorcraft having a power plant connected by a mechanical system to a rotary wing and to at least one propeller.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
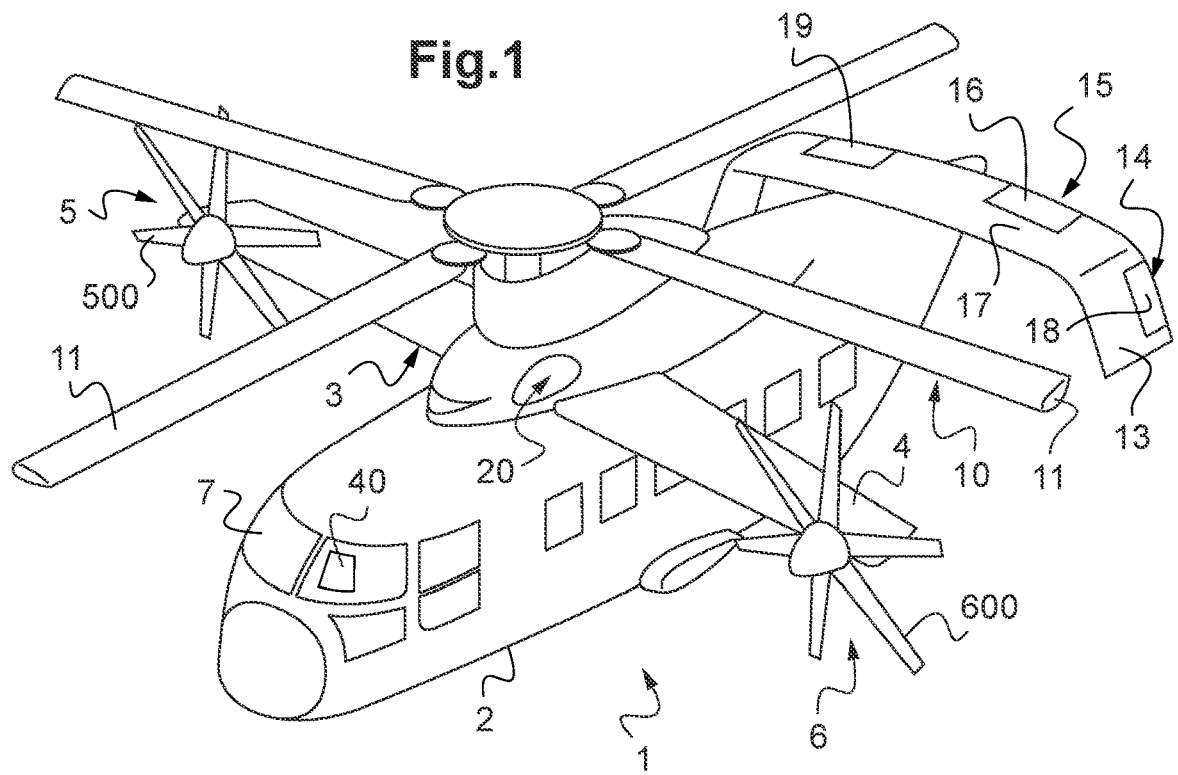
FIG. 1 is a perspective view of an example of a propeller rotorcraft according to the disclosure.

FIG. 1 shows a propeller rotorcraft 1 according to the disclosure.

The propeller rotorcraft 1 comprises a fuselage 2, at the front of which a cockpit 7 may be provided. The propeller rotorcraft 1 is further provided with a rotary wing 10 comprising blades 11.

Moreover, the propeller rotorcraft 1 comprises at least one propeller 5, 6 provided with blades 500, 600, arranged laterally relative to the fuselage 2 and/or at the rear of the fuselage 2, for example. Each propeller 5, 6 may be carried by a support 3, 4. The term "each" is used regardless of the number of propellers, i.e., both when a single propeller is present and when several propellers are present. Such a support may comprise at least one wing 3, 4 secured to the fuselage 2. According to the example shown in FIG. 1, the propeller rotorcraft 1 comprises two propellers 5, 6 carried respectively by two wings 3, 4 to either side of the fuselage 2.

Moreover, stabilizing and maneuvering surfaces may optionally be provided in the vicinity of the rear end of the fuselage 2, namely, for pitch control, at least one empennage 15, for example with at least one elevator 16, 19 that is able to move relative to a front part 17 and, for steering, at least one vertical stabilizer 14. The vertical stabilizers 14 may be constituted by a fixed front part 13 with a movable part 18 at the rear.

In order to rotate the rotary wing 10 and the propeller or propellers 5, 6, the propeller rotorcraft 1 comprises a power plant 20.

Figure 2:
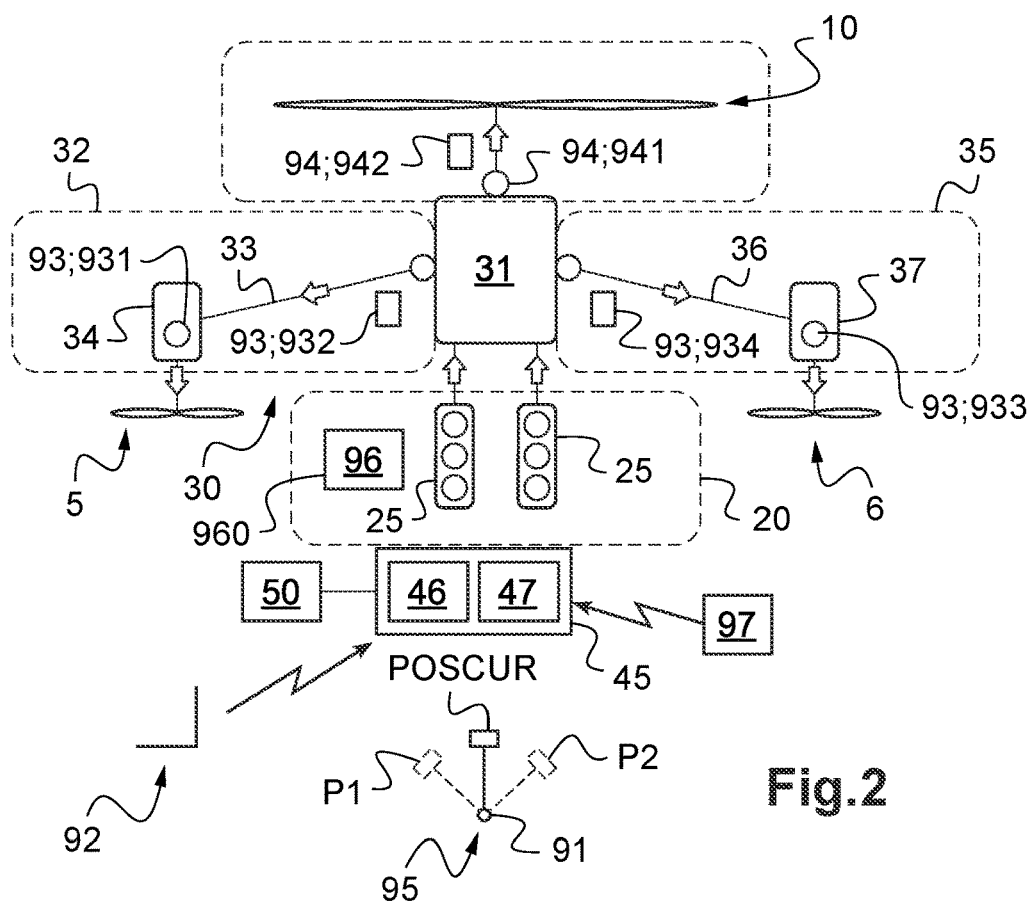
FIG. 2 is a diagram showing a power plant of a propeller rotorcraft according to the disclosure.

In reference to FIG. 2, the power plant 20 comprises at least one engine 25 connected to the rotary wing 10 and to the propeller or propellers 5, 6 by a mechanical system 30. The mechanical system 30 may be an interconnection system connecting the rotary wing and the propeller or propellers together.

The speeds of rotation of the outputs of the engines 25, the propeller or propellers 5,6, the rotary wing 10 and the power transmission members of the mechanical system 30 are optionally proportional to each other during flight, at least level flight.

The mechanical system 30 may for example comprise a main gearbox 31 connected to the engine or engines 25. Moreover, the main gearbox 31 is connected to each propeller 5, 6 by a power transmission line 32, 35. According to the example shown, each power transmission line 32, 35 comprises at least one or more shafts 33, 36 connecting the main gearbox 31 to a lateral gearbox 34, 37 leading to a propeller 5, 6.

In order to control the forward travel of the propeller rotorcraft 1, the pilot is provided with an interface 95 connected to the propeller or propellers 5, 6 via a control channel allowing the mean pitch of the blades 500, 600 of each propeller 5, 6 to be modified collectively and in the same manner.

More specifically, the interface 95 acts identically on the pitch of the blades of the propeller or propellers 5, 6 in order to implement a collective variation of these pitches. For example, the pilot will require a 5° increase in the pitch of all of the blades 500, 600 of the propellers 5, 6 in order to increase the resulting thrust generated by the propellers 5, 6. In particular, the interface 95 acts on a mean pitch component of the pitch of the blades 500, 600 of the propeller or propellers 5, 6 arranged to either side of the fuselage. When two propellers 5, 6 are present, the mean pitch is equal to half the sum of the pitch of the blades of the first propeller 5 and the pitch of the blades of the second propeller 6.

This interface 95 may also be moved, for example relative to a support, from a first position POS1 to a second POS2 shown by dashed lines. In the first position POS1, the interface 95 positions the pitch of the propeller or propellers 5, 6 at a minimum pitch, for example a pitch that is negative in relation to a reference. In the second position POS2, the interface 95 positions the pitch of the propeller or propellers 5, 6 at a maximum pitch that is positive in relation to the reference. At any point in time, the interface 95 is in a current position POSCUR resulting in power consumption by the propeller or propellers 5, 6 equal to a current power PCUR.

In order to control the yaw attitude of the propeller rotorcraft 1, the pilot is provided with a yaw control device equipped with a yaw control means, typically a rudder bar, for example in order to implement a differential variation in the pitch of the blades 500, 600 of the propellers 5, 6 when two propellers 5, 6 are present, arranged to either side of the fuselage.

Finally, the propeller rotorcraft 1 is provided with conventional control means for collectively and cyclically controlling the pitch of the blades 11 of the rotary wing.

In order to avoid the possibility of manoeuvers that could put the propeller rotorcraft 1 in danger, this propeller rotorcraft 1 is provided with a piloting assistance device 40.

The piloting assistance device 40 comprises a computer 45 controlling a display means named display 50. Such a display 50 may comprise a screen or a surface illuminated by a light, for example.

The computer 45 may comprise one or more units, which may be remote, each having, for example, at least one processor 46 and at least one memory 47, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

Optionally, the computer 45 comprises a unit determining the values of various parameters and a unit controlling the display 50.

The computer 45 may comprise a unit integrated into the display or remote from this display. The computer 45 may be dedicated to the method of the disclosure or may also apply other functions.

According to the method of the disclosure, the computer 45 is configured to transmit a control signal to the display 50 to display the required information.

To this end, the computer 45 may receive at least one position signal transmitted by a position sensor 91. The position sensor 91 emits an analog or digital and electrical or optical signal to the computer 45, carrying a current position POSCUR of the movable interface 95. For example, such a position sensor 91 may comprise a potentiometer, this example being given purely by way of illustration.

The computer 45 may receive at least one speed signal transmitted by a forward speed sensor 92 of the propeller rotorcraft 1. The forward speed sensor 92 emits an analog or digital and electrical or optical signal to the computer 45 carrying a current forward speed VCUR of the propeller rotorcraft 1 and, for example, an air speed or a ground speed. For example, such a forward speed sensor 92 may comprise a Pitot tube system or a receiver of a satellite positioning system, these examples being given purely by way of illustration.

The computer 45 may receive at least one propeller power signal transmitted by a propeller power sensor 93 in order to determine the power consumed by the propeller 5, 6 or jointly by the propellers 5, 6, as the case may be.

The propeller power sensor 93 may comprise, for each propeller 5, 6, a torque sensor 931, 933 and a propeller rotation speed sensor 932, 934, for example arranged on a power transmission line 32, 35 or indeed on a shaft 33, 36 of this power transmission line 32, 35. Such a torque sensor 931, 933 may, for example, comprise a strain gauge system and with wireless transmission between the rotating part that is being observed and a receiver. A unit of the computer 45 may receive the emitted measurement signals and deduce an intermediate power therefrom by multiplying the measured engine torque and the measured speed of rotation, the power consumed by the propellers 5, 6 as a whole being equal to the sum of the intermediate powers.

The computer 45 may receive at least one rotor power signal transmitted by a rotor power sensor 94 in order to determine the rotor power consumed by the rotary wing 10. The rotor power sensor 94 may comprise a torque sensor 941 and a rotor rotation speed sensor 942, for example arranged on a rotor mast at the output of the main gearbox 31. Such a torque sensor 941 may, for example, comprise a strain gauge system and with wireless transmission between the rotating part that is being observed and a receiver. A unit of the computer 45 may receive the emitted measurement signals and deduce the power consumed by the rotary wing 10 therefrom by multiplying the measured engine torque and the measured speed of rotation.

The computer 45 may receive at least one engine power signal transmitted by an engine power sensor 96 in order to determine the power consumed by the engine or engines 25. Such an engine power sensor 96 may comprise a conventional engine sensor of the engines 25 and, for example, for each engine 25, a torque sensor and an engine rotation speed sensor, for example arranged on an output shaft of the engine 25. The engine power sensor 96 may communicate with the computer 45 directly or via an engine computer 960, for example.

In a conventional manner, an engine computer 960 may transmit a signal to the computer 45 carrying an available power PDISP that can be produced by the power plant 20, for example by taking into account installation losses and the power consumed by members other than the rotary wing and the propeller or propellers, in a conventional manner.

The computer 45 may receive at least one angle of attack signal transmitted by at least one conventional angle of attack sensor 97. Such an angle of attack sensor may comprise an air speed measurement sensor, for example a Pitot tube system, and a vertical speed sensor, for example an inertial unit or an equivalent. A computer can then determine the angle of attack signal according to a law based on the components of the air speed relative to the rotorcraft.

Figure 3:
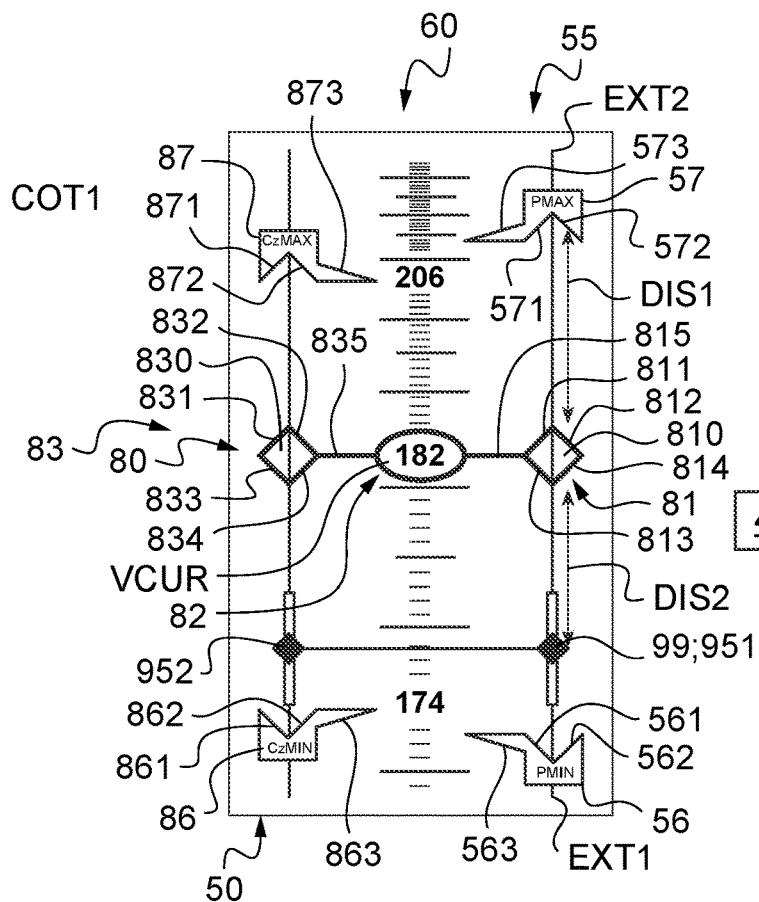
FIG. 3 is a diagram showing a piloting assistance device.

In reference to FIG. 3, the computer 45 is configured to apply the method of the disclosure by positioning and displaying on the display 50 various symbols to help a pilot avoid exceeding limits, in particular a structural limit of the mechanical system 30 or a limit of power delivered to the rotary wing 10, or indeed to prevent the blades 500, 600 of the propeller or propellers 5, 6 from stalling, from an aerodynamic point of view.

Therefore, according to the method of the disclosure, the computer 45 transmits a signal to the display 50 to display a first scale 55 representing a power consumed by the propeller or jointly by the propellers 5, 6. The first scale 55 extends from a first end EXT1 to a second end EXT2.

Moreover, the computer 45 transmits a signal to the display 50 to display a second scale 60 graduated in forward speed of the propeller rotorcraft 1.

The first scale 55 and the second scale 60 may be parallel to each other.

Moreover, the computer 45 transmits a signal to the display 50 to position and display an index 80 pointing to both the first scale 55 and the second scale 60.

The index 80 makes it possible to view the current situation by indicating the current forward speed VCUR of the propeller rotorcraft 1 on the second scale and by displaying, on the first scale 55, the power consumed by the propeller or propellers 5, 6.

In particular, the index 80 comprises a power section 81 that is able to move along the first scale 55. Moreover, the index 80 comprises a speed section 82 indicating a current forward speed VCUR on the second scale 60.

The power section 81 may be connected to the speed section 82. For example, the power section 81 comprises a hollow diamond 810 having two top faces 811, 812 situated above two bottom faces 813, 814. Moreover, the power section 81 may comprise a horizontal segment 815 connecting the diamond 810 to the speed section 82.

The speed section 82 may comprise a hollow shape surrounding the current forward speed value VCUR, for example an ellipse.

Moreover, the computer 45 may transmit a signal to the display 50 to position and display a minimum power mark 56 on the first scale 55. The minimum power mark 56 may comprise a base optionally linked to a segment 563 directed towards the second scale 60. The shape of the base of the minimum power mark 56 matches a shape of the power section 81. For example, the base of the minimum power mark 56 comprises two lower faces 561, 562 forming a V shape and matching the bottom faces 813, 814 of the diamond 810 of the power section 81.

Similarly, a maximum power mark 57 may be situated on the first scale 55 by the computer 45. The maximum power mark 57 may comprise a base optionally linked to a segment 573 directed towards the second scale 60. The shape of the base of the maximum power mark 57 matches a shape of the power section 81. For example, the base of the maximum power mark 57 comprises two upper faces 571, 572 forming an inverted V shape and matching the top faces 811, 812 of the diamond 810 of the power section 81.

According to one possibility, the index 80 and the first scale 55 are made movable relative to each other by the computer 45, the index 80 and the second scale 60 being made movable relative to each other by the computer 45.

For example, the first scale 55 is stationary. The minimum power mark 56 and the maximum power mark 57 are then able to move on the display 50, the computer determining their positions on the first scale.

Moreover, the index 80 is made movable relative to the first scale 55 by the computer 45. To this end, the computer 45 calculates the position of the index 80 relative to the first scale.

The computer 45 then adjusts the second scale 60 such that the index 80 pinpoints the current forward speed VCUR.

The first scale 55 may or may not comprise graduations. Similarly, the second scale 60 may or may not comprise graduations.

According to the example shown, the first scale 55 is stationary and does not comprise graduations. Conversely, the second scale 60 is variable, being able to be moved, compressed or expanded, and comprises graduations 61. Such an indicator has the advantage of being highly legible to a pilot.

Various variants may be considered in order to position the index 80 within the first scale 55.

According to the first variant, the first scale 55 indirectly indicates the current power PCUR, by representing the position of the interface 95. The first end EXT1 represents the first position POS1 and the second end EXT2 represents the second position POS2. The computer 45 therefore determines the position of the interface 95 based on the signal transmitted by the position sensor 91, and consequently positions the index 80 in the corresponding location.

To this end, the computer 45 determines a current power POUR consumed by the propeller or propellers 5, 6 based on the signal transmitted by the propeller power sensor 93.

Moreover, the computer 45 determines a maximum limit power PMAX and a minimum limit power PMIN not to be passed under normal flight conditions.

For example, the computer 45 determines, on receipt of the signal transmitted by the rotor power sensor 94, the rotor power PROT consumed by the rotary wing 10. Moreover, the computer 45 determines the available power PDISPO. Optionally, the available power PDISPO is established as a function of installation losses and the power consumed by members other than the rotary wing and the propeller or propellers, in a conventional manner, or these installation and power losses are disregarded. For example, an engine computer 960 determines the available power PDISPO in the current flight mode in a conventional manner and transmits a signal to the computer 45 carrying this available power PDISPO. According to another example, the computer 45 comprises a table or an equivalent providing the available power PDISPO for each flight mode, and determines the available power PDISPO in the current flight mode, the engine computer 960 or another member transmitting the current flight mode to the computer 45.

Therefore, the power PMAX may be equal to the available power PDISPO minus the rotor power PROT.

According to another example, the mechanical system 30 may withstand a limit power PLIM safely, and for example without damage to the power transmission lines 32, 35. Therefore, the maximum power PMAX may be equal to the lesser of this limit power PLIM and the available power PDISPO minus the rotor power PROT. The limit power PLIM may be stored. Alternatively, the computer 45 calculates the limit power according to the method by multiplying a stored predetermined torque by a possible proportionality coefficient and by a speed of rotation transmitted by a propeller speed sensor, i.e., one of the propeller rotation speed sensors 932, 934.

Moreover, the computer 45 is configured to determine the minimum power PMIN that can be consumed by the propeller or propellers 5, 6. The minimum power mark 56 then carries this minimum power PMIN. According to one example, this minimum power PMIN may be stored. According to another example, this minimum power PMIN may be calculated by the computer 45 and may be equal to the product of the stored predetermined torque and a speed of rotation of a propeller measured with a propeller rotation speed sensor 932, 934. When several propellers are present, the propellers may have the same speed of rotation.

Therefore, the computer 45 is configured to determine in which position the interface 95 can produce the maximum power PMAX and the minimum power PMIN in order to situate the maximum power mark 57 and the minimum power mark 56.

To this end, the computer 45 calculates a first difference between the current power POUR and the maximum power PMAX, and a second difference between the current power POUR and the minimum power PMIN.

The computer 45 converts said first difference and the second difference into first and second respective pitch margins relative to the pitch of the blades 500, 600 of the propellers 5, 6 by means of a pitch law providing a pitch margin MRGPAS based on a power margin MRGP and a power gradient GRD as a function of the pitch, i.e., MRGPAS=MRGP×GRD.

The teaching of patent FR 2 946 322 in relation to this law can be used, in particular to determine the value of said gradient.

Therefore, the computer 45 converts said first pitch margin and said second pitch margin into a first distance DIS1 and a second distance DIS2 by means of a conversion law. Such a conversion law gives the distance in question as a function of the pitch margin in question, for example. The computer 45 then transmits a signal to the display 50 to display the maximum power mark 57 and the minimum power mark 56 at the required positions.

According to the second variant, the first scale 55 directly indicates the current power POUR.

According to the method of the disclosure, the computer 45 is configured to determine the maximum power PMAX that can be consumed by the propeller or propellers 5, 6. The maximum power mark 57 then carries this maximum power PMAX and is situated at the appropriate location on the first scale 55.

Moreover, the computer 45 is configured to determine the minimum power PMIN that can be consumed by the propeller or propellers 5, 6. The minimum power mark 56 then carries this minimum power PMIN and is situated at the appropriate location on the first scale 55.

Irrespective of the variant, when the index 80 is positioned, the second scale 60 is adjusted by the computer 45 to situate the value of the current forward speed VCUR at the speed section 82, or indeed in the speed section 82.

For example, the computer 45 may be configured to display a maximum lift mark 87 and a minimum lift mark 86 relative to the first scale. The maximum lift mark 87 and the minimum lift mark 86 are, for example, situated to the first side COT1 of the second scale, the maximum power mark 57 and the minimum power mark 56 being situated on the first scale to a second side COT2 of the second scale 60.

The index 80 may therefore comprise a lift section 83, for example connected to the speed section 82. The speed section is thus arranged between the lift section 83 and the power section 81.

For example, the lift section 83 comprises a hollow diamond 830 having two top faces 831, 832 situated above two bottom faces 833, 834. Moreover, the lift section 83 may comprise a horizontal segment 835 connecting the diamond 830 to the speed section 82, and optionally aligned with the horizontal segment 815 of the power section 81.

Moreover, the minimum lift mark 86 may comprise a base optionally linked to a segment 863 directed towards the second scale 60. The shape of the base of the minimum lift mark 86 matches a shape of the lift section 83. For example, the base of the minimum lift mark 86 comprises two lower faces 861, 862 formant a V shape and matching the bottom faces 833, 834 of the diamond of the lift section 83.

Similarly, the maximum lift mark 87 may comprise a base optionally linked to a segment 873 directed towards the second scale 60. The shape of the base of the maximum lift mark 87 matches a shape of the lift section 83. For example, the base of the maximum lift mark 86 comprises two upper faces 871, 872 forming an inverted V shape and matching the top faces 831, 832 of the diamond of the lift section 83.

In order to position the maximum lift mark 87 and the minimum lift mark 86, the computer 45 calculates the position of the maximum lift mark 87 and the position of the minimum lift mark 86 relative to the first scale and the first index by means of a placement law. With the maximum lift coefficient, the placement law provides the position of the maximum lift mark within the first scale 55. With the minimum lift coefficient, the placement law provides the position of the minimum lift mark within the first scale 55. The placement law may be a function, for example, of the current forward speed VCUR of the rotorcraft measured with the forward speed sensor 92, a speed of rotation of a propeller measured with the propeller rotation speed sensor 93, and/or an angle of attack of the rotorcraft measured with the angle of attack sensor 97.

Moreover, the computer 45 may calculate a maximum forward speed VMAX for a position of the index on the maximum lift mark 87 or the maximum power mark 57 closest to the index 80 and, according to the example of FIG. 3, the maximum lift mark 87. Similarly, the computer 45 may calculate a minimum forward speed VMIN for a position of the index 80 on the minimum lift mark 86 or the minimum power mark 56 closest to the index 80 and, according to the example of FIG. 3, the minimum lift mark 86.

The computer 45 then transmits a signal to the display 50 to display the value of the minimum forward speed VMIN at the appropriate mark and, if applicable, its arm. Similarly, the computer 45 transmits a signal to the display 50 to display the value of the maximum forward speed VMAX at the appropriate mark and, if applicable, its arm.

The computer 45 transmits a signal to the display 50 to consequently expand or compress the second scale 60.

Moreover, the computer 45 is configured to display a zero-thrust mark 99 carrying a zero forward thrust applied by the propeller or propellers 5, 6.

The computer 45 may calculate a mean pitch of the blades 500, 600 of the propeller or propellers 5, 6 generating the zero forward thrust, the propeller or propellers 5, 6 possibly each applying a non-zero thrust with the sole aim of jointly controlling the yawing motion of the rotorcraft 1. The computer 45 converts this pitch into a position within the first scale.

The computer 45 then positions the zero-thrust mark 99 relative to the first scale 55.

The zero-thrust mark 99 may comprise a shape that matches a shape of the power section 81 or indeed the lift section 83.

For example, the zero-thrust mark 99 comprises at least one diamond 951 that can fit within the power section 81. Optionally, the zero-thrust mark 99 comprises two diamonds 951, 952 connected by a horizontal segment, one diamond 952 being able to fit within the lift section 83 and one diamond 951 being able to fit within the power section 81.

FIG. 3 shows the operation of the piloting assistance device 40 when the propeller or propellers 5, 6 apply thrust to move the propeller rotorcraft 1 forward.

Figure 4:
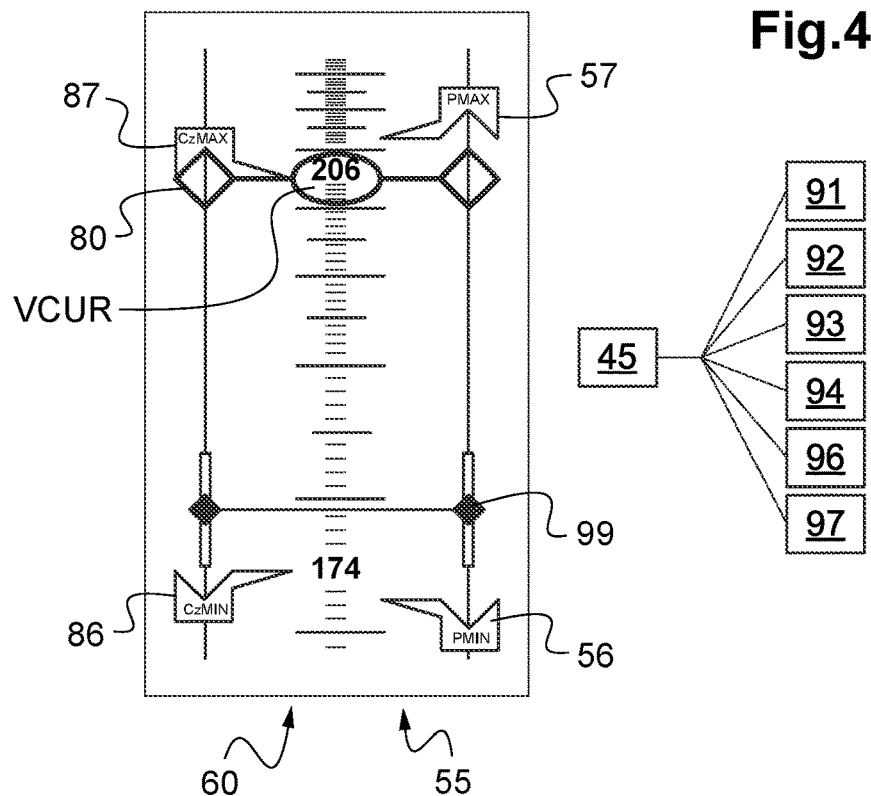
FIG. 4 is a diagram showing a piloting assistance device.

In reference to FIG. 4, when the pitch of the blades 500, 600 of each propeller 5, 6 increases, the index 80 moves upwards, i.e., towards the maximum power mark 57 and, if applicable, towards the maximum lift mark 87. If the maximum lift mark 87 is reached, the pitch of the blades 500, 600 of each propeller 5, 6 should not be increased further.

Figure 5:
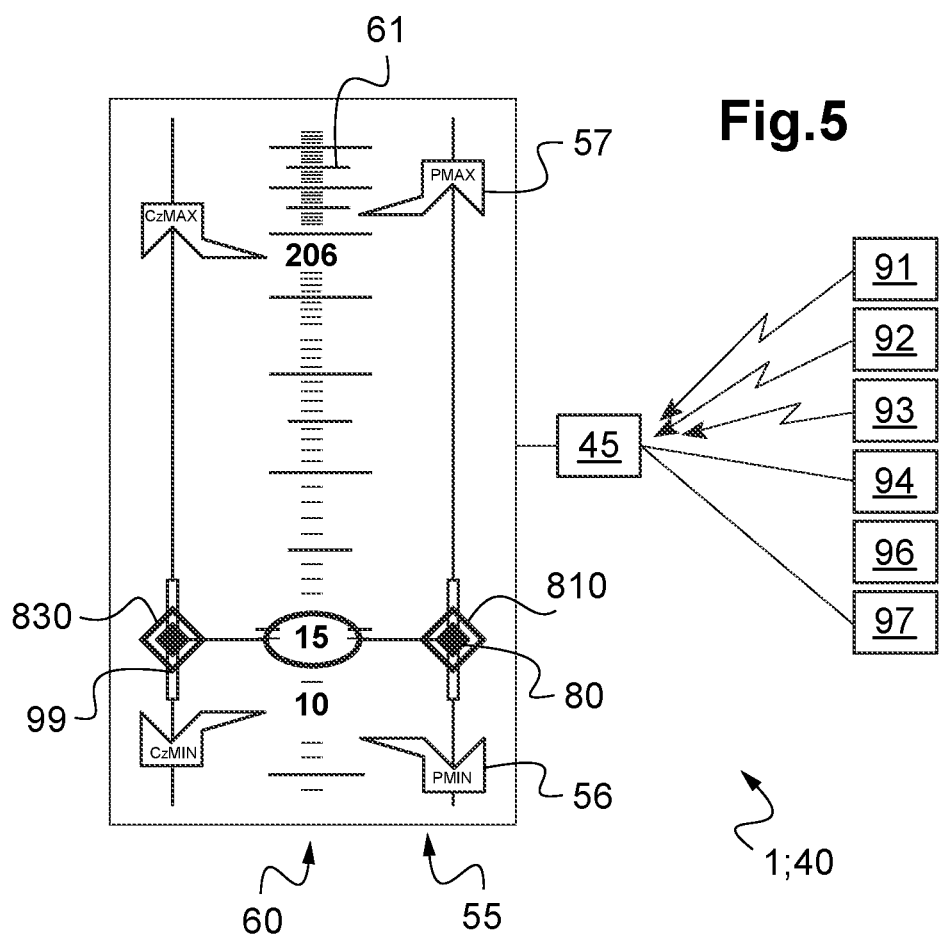
FIG. 5 is a diagram showing a piloting assistance device.

In reference to FIG. 5, when the pitch of the blades 500, 600 of each propeller 5, 6 decreases, the index 80 moves downwards, i.e., towards the minimum power mark 56 and, if applicable, towards the minimum lift mark 86. If the zero-thrust mark 99 is reached, the rotorcraft 1 may be in a hovering flight phase.

Figure 6:
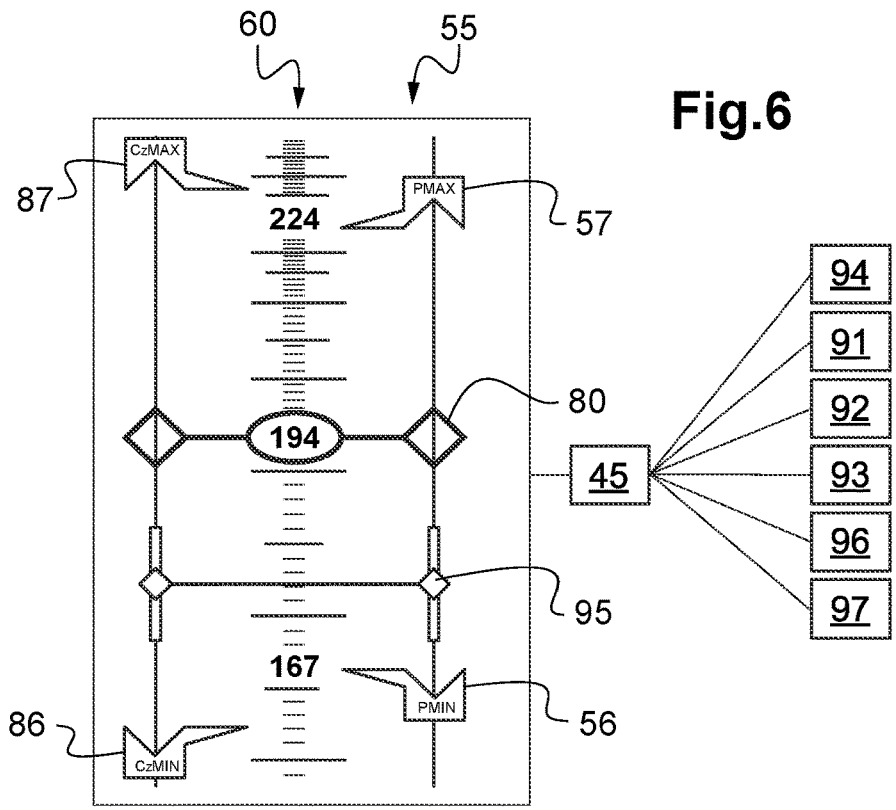
FIG. 6 is a diagram showing a piloting assistance device.
Figure 7:
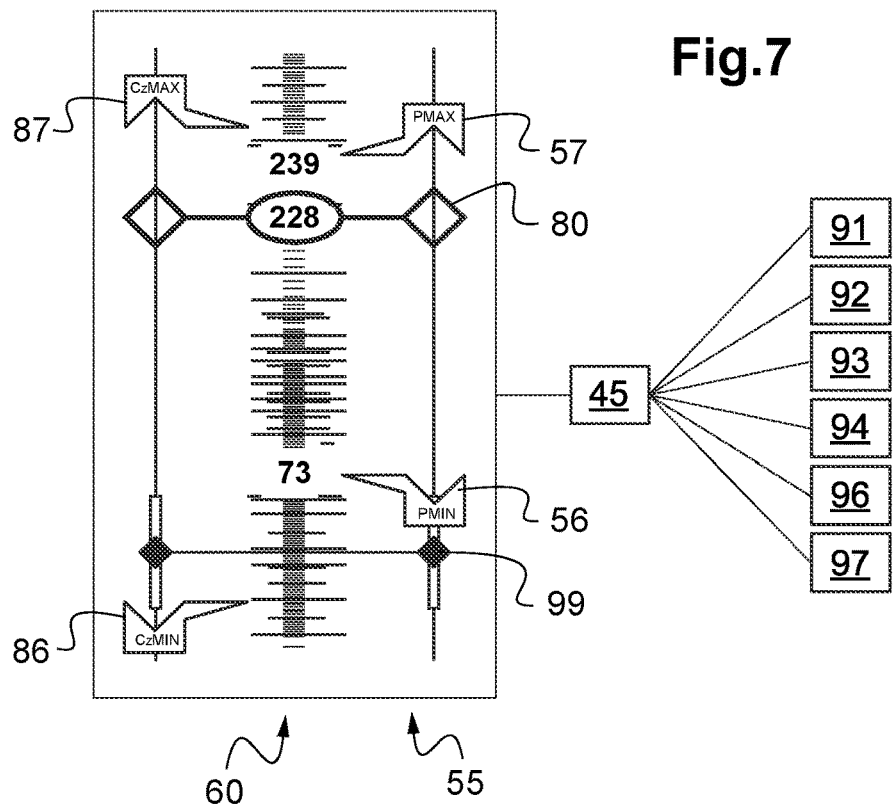
FIG. 7 is a diagram showing a piloting assistance device.

FIGS. 6 and 7 show the fact that the lift, power and zero-thrust marks are able to move.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for assisting the piloting of a propeller rotorcraft, the propeller rotorcraft having a power plant connected by a mechanical system to a rotary wing and to at least one propeller,
wherein the method comprises the following steps:
displaying, at the command of a computer and on a display, a minimum power mark and a maximum power mark on a first scale, the first scale representing a power consumed by the at least one propeller, the minimum power mark representing a minimum power that can be consumed by the at least one propeller, the maximum power mark representing a maximum power that can be consumed by the at least one propeller;
displaying, at the command of the computer and on the display, a second scale graduated in forward speed of the propeller rotorcraft;
displaying, at the command of the computer and on the display, an index comprising a power section representing a current power consumed by the at least one propeller, the index comprising a speed section indicating a current forward speed on the second scale, the index and the first scale being able to move relative to each other, the index and the second scale being able to move relative to each other; and
displaying, on the display and at the command of the computer, a zero-thrust mark carrying a zero forward thrust applied by the at least one propeller; and
wherein the zero-thrust mark comprises a shape that matches a shape of the power section.

2. The method according to claim 1,
wherein the method comprises, at the command of the computer, displaying the index on the display, relative to the first scale, and displaying the minimum power mark and the maximum power mark on the display, relative to the index, and adjusting the second scale in order for the index to indicate the current forward speed.

3. The method according to claim 1,
wherein the method comprises using a position sensor to measure a current position of an interface controlling a mean pitch of each blade of the at least one propeller, the interface being able to move between a first position and a second position shown by ends of the first scale, the first scale being graduated in positions of the interface, the method comprising the following steps:
using the computer to determine the maximum power, the minimum power and the current power;
displaying, on the display controlled by the computer, the index as a function of the current position;

displaying, on the display controlled by the computer, the maximum power mark relative to the index as a function of a first difference between the current power and the maximum power; and displaying, on the display controlled by the computer, the minimum power mark relative to the index as a function of a second difference between the current power and the minimum power.

4. The method according to claim 3,
wherein the method comprises using the computer to convert the first difference and the second difference into first and second respective pitch margins by means of a pitch law providing a pitch margin based on a power margin and a power gradient as a function of the pitch, the method comprising using the computer to convert, by means of a conversion law, the first pitch margin and the second pitch margin into a first distance separating the index from the maximum power mark and a second distance separating the index from the minimum power mark.

5. The method according to claim 1,
wherein the method comprises the following steps:
using the computer to determine the maximum power, the minimum power and the current power; and
using the computer to position the index and the minimum power mark and maximum power mark relative to the first scale as a function of the current power and the minimum power and the maximum power, the first scale being graduated in power.

6. The method according to claim 3,
wherein using of the computer to determine the maximum power comprises the following steps:
using the computer to determine an available power that can be delivered by the power plant, an engine power sensor transmitting an engine power signal carrying the available power to the computer;
using the computer to determine a rotor power consumed by the rotary wing, a rotor power sensor transmitting a rotor power signal carrying the rotor power to the computer; and
using the computer to determine a difference between the available power and the rotor power.

7. The method according to claim 6,
wherein using of the computer to determine the maximum power comprises:
using the computer to determine a limit power of the mechanical system, the maximum power being equal to the lesser of the limit power and the difference between the available power and the rotor power.

8. The method according to claim 7,
wherein the piloting assistance device comprises a propeller speed sensor transmitting a speed signal to the computer carrying a speed of rotation of the at least one propeller, the limit power being equal to the product of a predetermined torque and the speed of rotation.

9. The method according to claim 1,
wherein the minimum power is either a constant or is equal to the product of a predetermined torque and a speed of rotation measured by a propeller speed sensor transmitting a speed signal to the computer carrying the speed of rotation.

10. The method according to claim 1,
wherein the power section comprises a shape that matches a shape of the minimum power mark and a shape of the maximum power mark.

11. The method according to claim 10,
wherein the power section comprises a hollow diamond shape, the maximum power mark having two upper faces matching two faces of the diamond and the minimum power mark having two lower faces matching two other faces of the diamond.

12. The method according to claim 1,
wherein the speed section surrounds a value of the current forward speed.

13. The method according to claim 1,
wherein the first scale and the second scale are parallel to each other.

14. The method according to claim 1,
wherein the method comprises displaying, on the display, at the command of the computer, relative to the first scale, a maximum lift mark carrying the maximum lift coefficient of the at least one propeller and a minimum lift mark carrying the minimum lift coefficient of the at least one propeller, the index comprising a lift section having a shape that matches a shape of the minimum lift mark and a shape of the maximum lift mark.

15. The method according to claim 14,
wherein, the second scale separating a first side and a second side, the maximum lift mark and the minimum lift mark are situated on the first side, the maximum power mark and the minimum power mark being situated on the first scale, on the second side.

16. The method according to claim 14,
wherein the method comprises using the computer to determine positions of the maximum lift mark and the minimum lift mark in relation to the first scale as a function of a placement law providing the position of the maximum lift mark within the first scale as a function of the maximum lift coefficient and the position of the minimum lift mark within the first scale as a function of the minimum lift coefficient.

17. The method according to claim 14,
wherein the method comprises the following steps:
using the computer to calculate a maximum forward speed for a position of the index on the maximum lift mark or the maximum power mark closest to the index, and displaying this maximum forward speed on the display;
using the computer to calculate a minimum forward speed for a position of the index on the minimum lift mark or the minimum power mark closest to the index, and displaying this minimum forward speed on the display; and
using the computer to adjust the second scale as a function of the current forward speed, the minimum forward speed (VMIN) and the maximum forward speed.

18. The method according to claim 1,
wherein the zero-thrust mark is in the shape of a diamond that can fit into a hollow diamond of the power section.

19. A device for assisting the piloting of a propeller rotorcraft, the propeller rotorcraft having a power plant connected by a mechanical system to a rotary wing and to at least one propeller, wherein the piloting assistance device comprises a computer and a display configured to apply the method according to claim 1, the computer being configured to: control the display to display a minimum power mark and a maximum power mark on a first scale, the first scale representing a power consumed by the at least one propeller, the minimum power mark representing a minimum power that can be consumed by the at least one propeller, the maximum power mark representing a maximum power that can be consumed by the at least one propeller; control the display to display a second scale graduated in forward speed of the propeller rotorcraft; control the display to display an index comprising a power section representing a current power consumed by the at least one propeller, the index comprising a speed section indicating a current forward speed on the second scale, the index and the first scale being able to move relative to each other, the index and the second scale being able to move relative to each other; and control the display to display a zero-thrust mark carrying a zero forward thrust applied by the at least one propeller.

20. The device according to claim 19,
wherein the piloting assistance device comprises at least one of the following members: a position sensor emitting a signal carrying a current position of an interface controlling a mean pitch of blades of the at least one propeller, a forward speed sensor emitting a signal to the computer carrying a current forward speed of the rotorcraft, a propeller power sensor emitting a signal to the computer carrying a power consumed by the at least one propeller, a rotor power sensor emitting a signal to the computer carrying a power consumed by the rotary wing, an angle of attack sensor emitting a signal to the computer carrying an angle of attack of the rotorcraft, an engine power sensor emitting a signal to the computer carrying a power consumed by the power plant and an engine computer emitting a signal to the computer carrying an available power.

21. A propeller rotorcraft, the propeller rotorcraft having a power plant connected by a mechanical system to a rotary wing and to at least one propeller,
wherein the propeller rotorcraft comprises the piloting assistance device according to claim 19.

22. A method for assisting the piloting of a propeller rotorcraft, the propeller rotorcraft having a power plant connected by a mechanical system to a rotary wing and to at least one propeller,
wherein the method comprises the following steps:
displaying, at the command of a computer and on a display, a minimum power mark and a maximum power mark on a first scale, the first scale representing a power consumed by the at least one propeller, the minimum power mark representing a minimum power that can be consumed by the at least one propeller, the maximum power mark representing a maximum power that can be consumed by the at least one propeller;
displaying, at the command of the computer and on the display, a second scale graduated in forward speed of the propeller rotorcraft;
displaying, at the command of the computer and on the display, an index comprising a power section representing a current power consumed by the at least one propeller, the index comprising a speed section indicating a current forward speed on the second scale, the index and the first scale being able to move relative to each other, the index and the second scale being able to move relative to each other;
wherein the method further comprises using a position sensor to measure a current position of an interface controlling a mean pitch of each blade of the at least one propeller, the interface being able to move between a first position and a second position shown by ends of the first scale, the first scale being graduated in positions of the interface, the method comprising the following steps:
using the computer to determine the maximum power, the minimum power and the current power;
displaying, on the display controlled by the computer, the index as a function of the current position;
displaying, on the display controlled by the computer, the maximum power mark relative to the index as a function of a first difference between the current power and the maximum power; and
displaying, on the display controlled by the computer, the minimum power mark relative to the index as a function of a second difference between the current power and the minimum power.

23. A method for assisting the piloting of a propeller rotorcraft, the propeller rotorcraft having a power plant connected by a mechanical system to a rotary wing and to at least one propeller,
wherein the method comprises the following steps:
displaying, at the command of a computer and on a display, a minimum power mark and a maximum power mark on a first scale, the first scale representing a power consumed by the at least one propeller, the minimum power mark representing a minimum power that can be consumed by the at least one propeller, the maximum power mark representing a maximum power that can be consumed by the at least one propeller;
displaying, at the command of the computer and on the display, a second scale graduated in forward speed of the propeller rotorcraft;
displaying, at the command of the computer and on the display, an index comprising a power section representing a current power consumed by the at least one propeller, the index comprising a speed section indicating a current forward speed on the second scale, the index and the first scale being able to move relative to each other, the index and the second scale being able to move relative to each other; and
wherein the power section comprises a shape that matches a shape of the minimum power mark and a shape of the maximum power mark.

24. A method for assisting the piloting of a propeller rotorcraft, the propeller rotorcraft having a power plant connected by a mechanical system to a rotary wing and to at least one propeller,
wherein the method comprises the following steps:
displaying, at the command of a computer and on a display, a minimum power mark and a maximum power mark on a first scale, the first scale representing a power consumed by the at least one propeller, the minimum power mark representing a minimum power that can be consumed by the at least one propeller, the maximum power mark representing a maximum power that can be consumed by the at least one propeller;
displaying, at the command of the computer and on the display, a second scale graduated in forward speed of the propeller rotorcraft;
displaying, at the command of the computer and on the display, an index comprising a power section representing a current power consumed by the at least one propeller, the index comprising a speed section indicating a current forward speed on the second scale, the index and the first scale being able to move relative to each other, the index and the second scale being able to move relative to each other; and
wherein the method further comprises displaying, on the display, at the command of the computer, relative to the first scale, a maximum lift mark carrying the maximum lift coefficient of the at least one propeller and a minimum lift mark carrying the minimum lift coefficient of the at least one propeller, the index comprising a lift section having a shape that matches a shape of the minimum lift mark and a shape of the maximum lift mark.

\* \* \* \* \*